[US Patent] 2,820,826
Patented Jan. 21, 1958

2,820,826

PREPARATION OF OXIMES

Samuel C. Temin, Cleveland, and Max Levine, East Cleveland, Ohio, assignors to Industrial Rayon Corporation, Cleveland, Ohio, a corporation of Delaware No Drawing. Application February 1, 1956
Serial No. 562,639

6 Claims. (Cl. 260—566)

This invention relates to a new and improved method for preparing oximes of aliphatic ketones. More particularly, it relates to a method for preparing such oximes by the reduction of certain aliphatic nitrohydrocarbons.

It is well known that oximes can be reduced by various chemical and catalytic treatments. However, the methods heretofore known have not been entirely successful since they require the use of expensive catalysts and other materials in complicated multi-step processes.

It has now been found that oximes may be prepared by a method of reducing nitroalkanes which does not require complicated processing steps or expensive catalytic materials.

In accordance with the present invention, aliphatic oximes may be prepared by a method which comprises reacting an aliphatic nitroalkane with an oxide selected from the group consisting of the oxides of arsenic, antimony and tin in a lower valence state.

The oximes prepared by the method of the present invention may be either straight chain aliphatic or cycloaliphatic compounds. Typical straight chain aliphatic oximes are ethanone oxime, 2-propanone oxime, 2-butanone oxime, 2-pentanone oxime, 3-hexanone oxime and so forth. The cycloaliphatic oximes of the present invention are those having between about five and seven carbon atoms in the ring such as cyclopentanone oxime, cyclohexanone oxime, cycloheptanone oxime, etc. Cyclohexanone oxime is particularly useful since it is one of the materials used in the synthesis of caprolactam which in turn is used in making polyamides.

The aliphatic nitroalkanes which are reduced to form the oximes in accordance with the present invention may contain either straight chain aliphatic or cycloaliphatic radicals depending upon the particular oxime desired. Typical nitroalkanes are nitroethane, 2-nitropropane, 2-nitrobutane, 2-nitropentane, 3-nitrohexane, etc. Particularly useful for the purposes of the present invention are the nitro derivatives of cycloalkanes; for example, nitrocyclopentane, nitrocyclohexane, nitrocycloheptane, etc.

As stated above, the oxide employed in the reduction of the nitroalkanes is selected from the group consisting of the oxides of arsenic, antimony and tin in a lower valence state. Particularly useful are arsenic trioxide, $As_2O_3$ or $(As_4O_6)$, which is the white arsenic of commerce known also as arsenous oxide; antimony trioxide, $Sb_2O_3$ or $(Sb_4O_6)$ also known as antimonous oxide; and stannous oxide, SnO. If desired, alkali metal salts of the reducing oxides also may be employed, e. g., sodium arsenite, etc.

Reduction of the nitroalkane in the presence of the reducing oxide takes place in an aqueous alkaline medium. It is desirable that the alkaline medium be employed in such a concentration and volume that the ingredients are easily dissolved therein.

The reduction of nitrocyclohexane to cyclohexanone oxime with arsenic trioxide in the presence of sodium hydroxide may be set forth as follows:

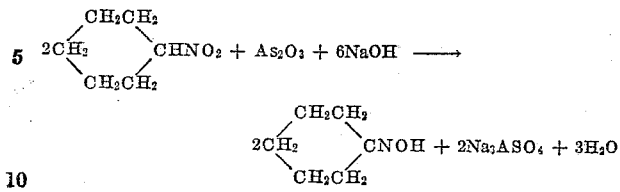

The ratio of the aliphatic nitroalkane to the reducing oxide in the reaction mixture is preferably between about two to one and one to one based on equivalent weights. If desired, however, a slight excess of the reducing oxide may be employed. The reduction of the nitroalkane may take place over a wide range from room temperature up to about 130° C. depending upon the particular reactants chosen. The lower molecular weight nitroalkanes are generally more reactive and thus lower temperatures may be employed. The reaction may be carried out either at atmospheric pressure or at subatmospheric or superatmospheric pressures depending upon the particular reactants employed.

The reduction of the nitroalkane in the aqueous alkaline medium may be stopped by neutralizing the basic solution with an acid. Normally, the reaction is not carried to the complete oxidation of the oxide to avoid the possibility of deleterious side reactions occurring. Usually, the reaction is sufficiently completed within about six to twenty-four hours depending upon the particular reactants and reaction conditions employed. Advantageously, when nitrocyclohexane is being reduced to the cyclohexanone oxime, a temperature between about 100° and 130° C. will complete the reaction to the desired extent within about ten to eighteen hours.

The oxime may be recovered from the neutralized reaction mixture by extraction, distillation, etc. Advantageously, the oxime is distilled from the portion of the neutralized reaction mixture remaining after the unreacted nitroalkane has been extracted.

The spent oxide catalysts employed in the reduction of the nitroalkane may be regenerated easily and inexpensively. For example, arsenic pentoxide, the oxidized form of arsenic trioxide, is converted to the lower valence form by heating in air.

This invention will be more fully described by the following example, although it is understood that the invention is not intended to be limited by this example. In this example "percent" of materials is intended to mean "percent by weight."

Example 47.4 grams of arsenic trioxide, $As_2O_3$, was dissolved in a solution consisting of 70 grams of sodium hydroxide in 400 grams of water. This solution was placed in a three-neck flask equipped with a water-cooled reflux condenser and a stirring mechanism. 60 grams of nitrocyclohexane was added and the reaction mixture heated with an oil bath maintained at about 130° C. The reaction mixture temperature was about 110° C. After seventeen hours, the reaction mixture was neutralized with a 50% sulfuric acid solution. The acid was added slowly while the mixture was being cooled so that the temperature did not rise above about 25° C. The unreacted nitrocyclohexane was extracted from the neutralized reaction mixture with ether. The remaining portion of the reaction mixture was distilled to yield 22 grams of substantially pure cyclohexanone oxime representing a 43% conversion. The total yield based on the recovered nitrocyclohexane is 63%.

We claim:
1. A method for preparing oximes which comprises mixing in an aqueous alkaline medium, a compound selected from the group consisting of nitroalkanes and nitrocycloalkanes, with an oxide selected from a group consisting of the oxides of arsenic, antimony and tin in a lower valence state, the equivalent weight ratio of the nitroalkane to the oxide in the mixture being between about two to one and one to one.

2. A method for preparing cycloaliphatic oximes which comprises mixing in an aqueous alkaline medium, a nitrocycloalkane, having between about five and seven carbon atoms in the ring with an oxide selected from a group consisting of the oxides of arsenic, antimony and tin in a lower valence state, the equivalent weight ratio of the nitroalkane to the oxide in the mixture being between about two to one and one to one.

3. A method for preparing oximes according to claim 1 in which the oxide is arsenic trioxide.

4. A method for preparing oximes according to claim 1 in which the oxide is antimony trioxide.

5. A method for preparing oximes according to claim 1 in which the oxide is stannous oxide.

6. A method for preparing cyclohexanone oxime which comprises mixing in an aqueous alkaline medium, nitrocyclohexane with arsenic trioxide, the equivalent weight ratio of the nitrocyclohexane to the arsenic trioxide in the mixture being between about two to one and one to one, heating said reaction mixture, and maintaining the temperature during said reaction below about 130° C.

References Cited in the file of this patent

UNITED STATES PATENTS

| | | |
|---|---|---|
| 2,233,823 | Susie et al. | Mar. 4, 1941 |
| 2,762,844 | Kaarsemaker | Sept. 11, 1956 |
| 2,768,206 | Kaarsemaker | Oct. 23, 1956 |

FOREIGN PATENTS

| | | |
|---|---|---|
| 977,099 | France | Nov. 8, 1950 |

OTHER REFERENCES

Konowaloff: "J. Chem. Soc." (1899), vol. 76, p. 733.
Grundmann: "Agnew. Chem." (1950), vol. 62, p. 558.